(12) United States Patent
Kikuchi

(10) Patent No.: US 7,267,269 B2
(45) Date of Patent: Sep. 11, 2007

(54) PRODUCT DISTRIBUTION MANAGEMENT SYSTEM, TONER CARTRIDGE DISTRIBUTION MANAGEMENT SYSTEM, AND PRODUCT DISTRIBUTION MANAGEMENT METHOD

(75) Inventor: Hiroshi Kikuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 173 days.

(21) Appl. No.: 11/010,393

(22) Filed: Dec. 14, 2004

(65) Prior Publication Data

US 2005/0263589 A1    Dec. 1, 2005

(30) Foreign Application Priority Data

May 28, 2004    (JP)    ............................. 2004-158761

(51) Int. Cl.
*G06K 15/00* (2006.01)
(52) U.S. Cl. .................. 235/383; 235/375; 235/385; 700/115
(58) Field of Classification Search ................ 235/385, 235/435; 700/115
See application file for complete search history.

(56) References Cited

U.S. PATENT DOCUMENTS 6,880,753 B2 * 4/2005 Ogihara et al. ............. 235/385

2002/0183882 A1 * 12/2002 Dearing et al. ............. 700/115
2002/0183891 A1 * 12/2002 Ostro ......................... 700/213
2005/0006469 A1 * 1/2005 Nonnerman et al. ........ 235/384

FOREIGN PATENT DOCUMENTS

| CN | 1416092 A | 5/2003 |
| JP | 2002-169879 | 6/2002 |

* cited by examiner

*Primary Examiner*—Seung Ho Lee
(74) *Attorney, Agent, or Firm*—Morgan, Lewis & Bockius LLP

(57) ABSTRACT

In a product distribution management system in which a product is packaged in an outer case and delivered, a product wireless tag is attached to a product such as a toner cartridge, and a product wireless tag ID is written on the tag at a production factory. Then, at a product warehouse, an outer-case wireless tag is attached to the outer case in which the product is packaged, and an outer-case wireless tag ID is written on this outer-case tag. A correlation computer correlates the product wireless tag ID and the outer-case wireless tag ID with each other. At a customer's premises, the outer-case wireless tag ID can be used, and at a recovery/recycling factory, the product wireless tag ID can be used. Production information, delivery information and recovery information are correlated with the wireless tag ID's and integrally managed at a data center.

19 Claims, 2 Drawing Sheets

| PRODUCT WIRELESS TAG | OUTER-CASE WIRELESS TAG | DELIVERY DESTINATION | DELIVERY TIME | RECOVERY TIME | |
|---|---|---|---|---|---|
| | | | | | |
| | | | | | |
| △ | ○ | ○ | ○ | △ | |
| | | | | | |
| | | | | | |

PRODUCT DISTRIBUTION MANAGEMENT SYSTEM, TONER CARTRIDGE DISTRIBUTION MANAGEMENT SYSTEM, AND PRODUCT DISTRIBUTION MANAGEMENT METHOD

BACKGROUND OF THE INVENTION

1. Field of the Invention

The present invention generally relates to distribution management of products, and in particular to a method and system for managing product distribution in which products are packaged in outer cases for delivery, and further particular to a distribution management of a product which is a toner cartridge.

2. Background Art

As a method for managing distribution of articles, a method is well known in which information identifying an article, such as the name of the article, is a bar code; a bar code label is attached to a surface of the article; and the bar code is read by a bar code reader.

The content of such a bar code is commonly an article name, and this data capacity may be insufficient to include individual information about the article, for example, a serial number among the same articles. Furthermore, as it is not possible to rewrite a bar code printed on a label, it is necessary to replace the bar code label with a new label if the data is changed. To attempt to address this problem, memory modules having a radio frequency identification (RFID) function, a large rewritable memory capacity have recently come to be used. The memory module having a RFID function is a small-sized module constructed by combining a rewritable memory on which data can be read and written with an antenna or the like, which provides a capability of performing wireless communication with an external reader/writer so that data can be written to the memory module with a RFID function and so that data stored therein can be read. An example of known memory modules with a RFID function is an IC card with a RFID function, a so-called wireless tag or ID tag to be attached to a part, and a RFID tag.

By using a memory module with a RFID function, such as a wireless tag, product data, such as quality data, can be stored along with identification data during or after production. Therefore, by attaching such a module to a product and distributing the module together with the product, quality data and the like specific to the product can be conveniently obtained anywhere. Furthermore, because data can be rewritten or additional data can be added, distribution management can be facilitated through use of additional data regarding the distribution history, for example.

For example, Japanese Patent Laid-Open Publication No. 2002-169879 discloses an individual management system for a white overall on which an ID tag has been attached. In the system described in this publication, an ID tag is sewn to a white overall. When the white overall is recovered from a customer, the ID tag is read and 'recover' registration is performed. Similarly, by reading the ID tag, 'accept' registration is performed at a warehouse; registration of 'receipt' into a factory is performed at a maintenance factory; processing is performed with a factory shipment terminal after washing or necessary repair has been performed; and delivery data is confirmed when the white overall is returned to the customer. Thus, by using an ID tag to obtain information about a product and performed at a processing at multiple distribution points through which the product flows, management of the product can be performed.

Japanese Patent Laid-Open Publication No. 2002-169879 describes a system in which a wireless tag attached to a product is used to perform distribution management. However, products are often packaged in outer cases and the like for delivery to customers. However, with this system, problems as described below remain.

Identification data or individual quality data of a product is specific to the product, and it is desirable that a wireless tag storing such data be directly attached to the product. However, when a product is packaged for delivery to a customer, it is more efficient and convenient to use a bar code or a wireless tag attached on the exterior of the package as it is then possible to read or write data without opening the package. In other words, distribution management can be performed using only a barcode or a wireless tag attached on an outer packaging case.

In such a case, if only the product without the outer packaging case is recovered, it is difficult to know the history of the recovered product because the product does not have a bar code or a wireless tag used for distribution management. Even if the product is recovered in any empty outer packaging case, the product is not necessarily returned in its original outer case, especially if some time has elapsed after it was taken out of the original outer case. Then, at this time, continuity of the data for distribution management may be broken.

Moreover, a database related to production and distribution from shipment to delivery of a product is commonly managed primarily by production and sales departments, while a database related to recovery of a product is often primarily managed by recycling and recovery departments. Therefore, the multiple databases are often utilized ineffectively and data is not correlated. In addition, the above described broken continuity of the data for the distribution management makes it more difficult to correlate the multiple databases with each other.

As described above, according to the prior-art technology, in the case where a product is packaged in an outer case for delivery to a customer, if the product and the outer case are separated from each other, the continuity of the distribution data of the product is lost. Accordingly, it is difficult to perform consistent distribution management throughout production, delivery, and recovery of the product.

Furthermore, correlation of a database for production and distribution of a product with a database for recovery of the product remains a troublesome and relatively difficult task. As a result, in the event that any problem arises in a product on the market, a great deal of time is required for retrieval of appropriate data, for example, for extraction of unrecovered products probably having same problem, it is difficult to respond quickly.

BRIEF SUMMARY OF THE INVENTION

The present invention advantageously provides a product distribution management method and system capable of consistent distribution management of production, delivery, and recovery of a product for product distribution management in which products are packaged in outer cases for delivery, and a method and system for managing distribution of a toner cartridge.

A product distribution management system according to the present invention may be configured as a system for performing distribution management of a product packaged in an outer case for delivery, using wireless tags fixed respectively on the product and the outercase, that enabled at a reading and written via wireless communication, said system comprising correlation means for correlating an ID of a product wireless tag fixed on the product and an ID of an outer-case wireless tag fixed on the outer case with each other; and multiple acquisition means for acquiring at least one of the product wireless tag ID and the outer-case wireless tag ID at each of multiple distribution points through which the product flows; and performing distribution management of the product using at least one of the both of the correlated wireless tag IDs.

It may be preferable that the correlation means correlate the product wireless tag ID and the outer-case wireless tag ID with each other at a point of shipment of the product.

It may also be preferable that the product distribution system according to the present invention comprises storage means for storing the correlated both wireless tag IDs', in the form of a contents list.

It may further be preferable that one of the multiple acquisition means, at a delivery point where the product is delivered to a customer, reads the outer-case wireless tag ID and acquires delivery information about delivery to the customer; and the storage means add the delivery information to the contents list in association with the product wireless tag ID and the outer-case wireless tag ID.

It may further be preferable that the delivery information includes information about the delivery time when the product has been delivered together with a customer code that identifies the customer to whom the product has been delivered.

It may further be preferable that one of the multiple acquisition means, at a recovery point where the product is recovered from the customer, reads the product wireless tag ID and acquires recovery information about the recovered product, including recovery time; and the storage means add the recovery information to the contents list in association with the product wireless tag ID and the outer-case wireless tag ID.

It may further be preferable that the product distribution management system according to the present invention comprises a recovery condition management apparatus for extracting products which have not been recovered from among shipped products based upon the content of the contents list stored in the storage means.

A product distribution management system according to the present invention may be configured as a system for performing distribution management of a product packaged in an outer case for delivery and returned to a recovery and recycling factory for recycling, using wireless tags fixed on the product and on the outer case, that enable data reading and written via wireless communication, said system comprising correlation means for correlating an ID of a product wireless tag fixed on the product and an ID of an outer-case wireless tag fixed on the outer case with each other; and multiple acquisition means for acquiring at least one of the product wireless tag ID and the outer-case wireless tag ID at each of multiple distribution points through which the product flows; and performing distribution management of the product using at least one of the both of the correlated wireless tag IDs.

A toner cartridge distribution management system according to the present invention maybe configured as a system for performing distribution management of a toner cartridge packaged in an outer case for delivery, using wireless tags fixed on the toner cartridge and the outercase, that enabled at a reading and written via wireless communication, said system comprising correlation means for correlating an ID of a toner cartridge wireless tag fixed on the toner cartridge and an ID of an outer-case wireless tag fixed on the outer case with each other; and multiple acquisition means for acquiring at least one of the toner cartridge wireless tag ID and the outer-case wireless tag ID at each of multiple distribution points through which the toner cartridge flows; and performing distribution management of the toner cartridge using at least one of the both of the correlated wireless tag IDs.

It may be preferable that the toner cartridge distribution management system according to the present invention further comprises storage means for storing both of the correlated wireless tag IDs in the form of a contents list; and confirmation means for confirming whether the toner cartridge, a consumable item, is within a period of life validity, based on content of the contents list stored in the storage means.

It may be preferable that the toner cartridge distribution management system according to the present invention further comprises identifying means for identifying a toner cartridge which is already beyond its period of life validity, based on the content of the contents list.

It may be preferable that the toner cartridge distribution management system according to the present invention further comprises retrieval means for retrieving data of a customer who has received a toner cartridge what should be recalled, based on the content of the contents list.

A product distribution management method according to the present invention may be configured as a method for performing distribution management of a product packaged in an outer case for delivery, using wireless tags fixed on the product and the outer case, that enable data reading and written via wireless communication, said method comprising a correlation step of correlating an ID of a product wireless tag fixed on the product and an ID of an outer-case wireless tag fixed on the outer case with each other; and an acquisition step of acquiring at least one of the product wireless tag ID and the outer-case wireless tag ID at each of multiple distribution points through which the product flows; and wherein distribution management of the product is performed using at least one of the both of the correlated wireless tag IDs.

It may also be preferable that, at the correlation step, the product wireless tag ID and the outer-case wireless tag ID are correlated with each other at a point of shipment of the product.

It may also be preferable that the product distribution management method according to the present invention further comprising a storage step of storing both of the correlated wireless tag IDs in the form of a contents list.

It may also be preferable that, at one of the multiple acquisition steps, the outer-case wireless tag ID is read and delivery information related to delivery to the customer is acquired at a delivery point where the product is delivered to a customer; and at the storage step, the delivery information is added to the contents list in correlation with the product wireless tag ID and the outer-case wireless tag ID.

It may also be preferable that, in the product distribution management method according to the present invention, the delivery information includes information concerning delivery time when the product has been delivered and a customer code that identifies the customer to whom the product has been delivered.

It may also be preferable that, at one of the multiple acquisition means, the product wireless tag ID is read and recovery information about the recovered product, including recovery time, is acquired at a recovery point where the product is recovered from the customer; and at the storage step, the recovery information is added to the contents list in correlation with the product wireless tag ID and the outer-case wireless tag ID.

It may also be preferable that the product distribution management method according to the present invention further comprises a recovery condition management step of extracting products which have not been recovered yet from among shipped products based on contents of the contents list stored in the storage means.

According to the above configuration, a product wireless tag ID and an outer-case wireless tag ID are correlated with each other. At each of distribution points, information concerning a product is acquired from at least one of the product wireless tag ID and the outer-case wireless tag ID. Because the product wireless tag ID and the outer-case wireless tag ID are correlated with each other, it is possible to create distribution management data of the product using the product wireless tag ID or the outer-case wireless tag ID, which is more convenient, at each distribution point. For example, distribution management data can be created using the outer-case wireless tag ID. In such a case, the distribution management data accumulated for the product can be referenced and retrieved using the product wireless tag ID, even after the product and its outer case are separated from each other. Accordingly, when a product is packaged in an outer case for delivery to a customer, it is possible to perform consistent distribution management of production, delivery and recovery of the product.

Correlation is performed when a product is shipped. That is, when a product is shipped, its product wireless tag ID and its outer-case wireless tag ID are correlated with each other. Therefore, it is thereafter possible to handle the product wireless tag ID and the outer-case wireless tag ID equivalently, and it is possible to retrieve and review all distribution management data from either of the wireless tag ID's, even if the distribution management data is created with the use of only either of the two.

The correlated information is stored as a contents list. By referring to the contents list when creating distribution management data, information regarding distribution management of a product can be integrally managed, and the entire distribution management data of the product can be acquired from any distribution point through which the product flows.

The outer-case wireless tag ID is read at a delivery point. Because the product packaged in an outer case for delivery, it is more convenient to use an outer-case wireless tag ID. Delivery information is then acquired, and the delivery information is correlated with the outer-case wireless tag ID and added to the contents list to form integrated data.

The delivery information includes delivery time data together with a customer code, which is acquired and added to the contents list. Accordingly, data for the time and location of delivery and data identifying the product delivered are managed as integrated data.

The product wireless tag ID is read at a recovery point. A product is often enclosed in any type of outer case when it is brought to a recovery point. If an outer-case wireless tag attached on that outer-case, this outer-case wireless tag is not necessarily correspond to the product inside of that outer-case. In such a case, it is preferable that the product wireless tag ID to be read. Then, recovery information including recovery time is acquired, and the recovery information is correlated with the product wireless tag ID, added to the contents list, and integrated with the existent data acquired at the shipment point and the delivery point to form integrated data.

Unrecovered products are extracted from shipped products based upon the content of the contents list. Because the data acquired at the shipment point, the delivery point, and the recovery point is integrated in the contents list, information regarding the state of all shipped products and all recovered products can be easily understood.

As described above, the product distribution management system according to the present invention enables consistent distribution management of production, delivery and recovery of a product when the product is packaged in an outer case for delivery to a customer.

When the product is a toner cartridge and the toner cartridge is packed in an outer case and delivered, consistent distribution management of production, delivery, and recovery of a toner cartridge is achieved.

By correlating production, delivery, and recovery information, it is possible to confirm whether the toner cartridge, a consumable item, has not expired, and identify toner cartridges which are already beyond their usable life, but have not yet been recovered. Further, it is possible to quickly retrieve data of the customers who have received toner cartridges that should be recalled.

BRIEF DESCRIPTION OF THE SEVERAL VIEWS OF THE DRAWINGS

Preferred embodiments of the present invention will be described in detail based on the following figures, wherein:

FIG. 2 shows an example contents list as employed in the embodiment of the present invention.

DETAILED DESCRIPTION OF THE INVENTION

Figure 1:
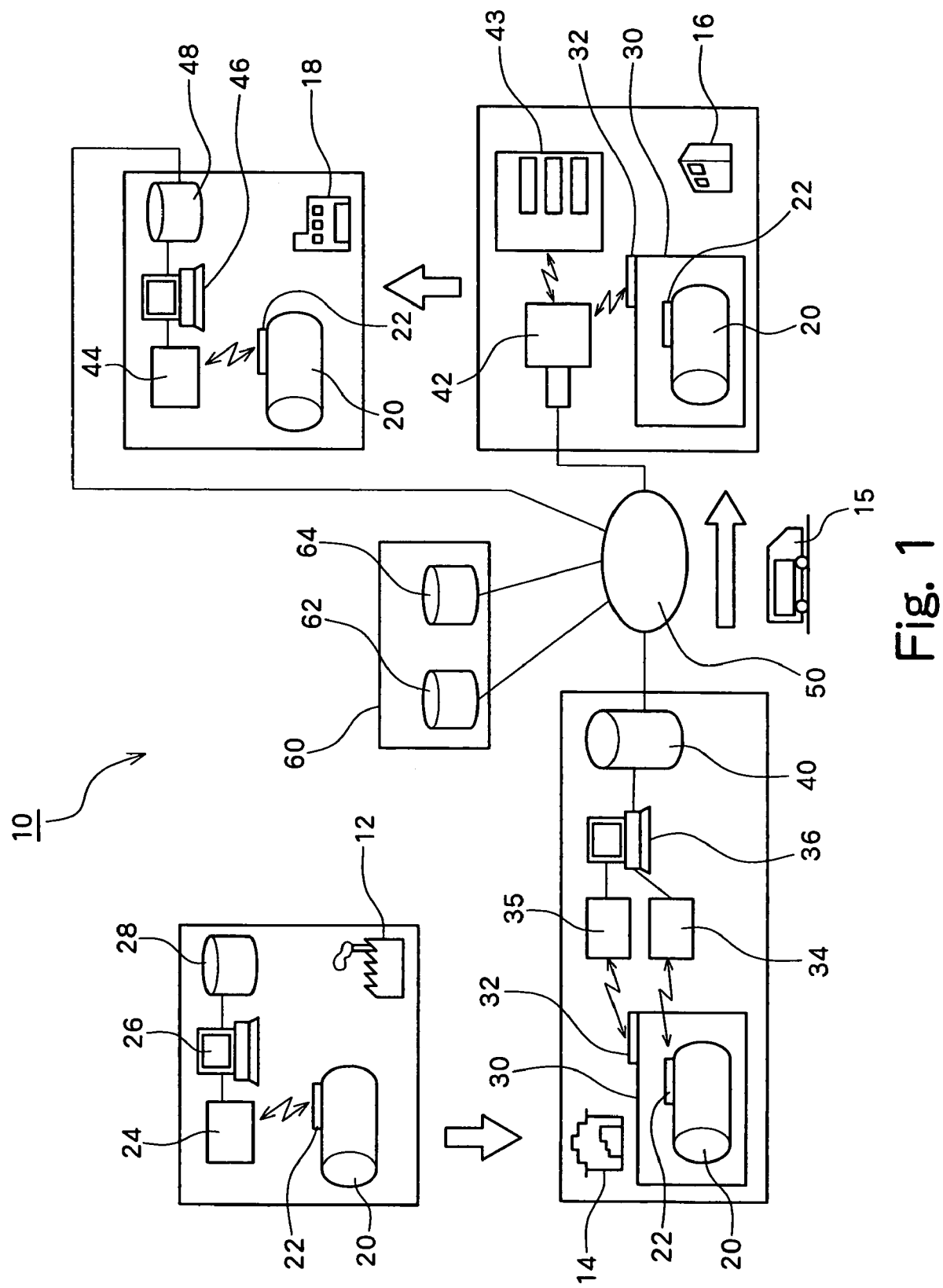
FIG. 1 shows components of a product distribution management system according to an embodiment of the present invention.

An embodiment according to the present invention will be described below in detail with reference to drawings. In the description below, a toner cartridge for a copier is used as an example of a product for which distribution management is to be performed. However, the product maybe any other copier component, such as, for example, a spare part such as a process cartridge including a development cartridge and a photoconductor drum, a circuit board, or the like. The present invention may also be employed with an image processing apparatus other than a copier, such as, for example, a facsimile machine and a printer, or with any product that is packaged in an outer case for delivery to a customer.

In the description below, the multiple distribution points through which a product flows are assumed to be a production factory, a product warehouse, a customer and a recovery/recycling factory of a product. However, it is not necessary that all of these be included, and it is further possible that distribution points other than these may be added. Furthermore, although it is assumed that there are multiple customers in the description below, there may instead, or additionally, be multiple production factories, product warehouses, or recovery/recycling factories.

There are many types of "wireless tags", as they are referred to in the marketplace, and the term "wireless tag" as used in this specification broadly refers to any such memory module with a RFID function and an antenna and which can wirelessly communicate with a wireless transceiver terminal, such as a reader/writer, and which can be attached to a product or an outer case, irrespective of how the term is currently used in a particular location or marketplace.

FIG. 1 shows the configuration of a product distribution management system 10 for a copier toner cartridge. The product distribution management system 10 is a system for integrally managing distribution of a toner cartridge 20, over a production factory 12 of the toner cartridge 20, a product warehouse 14 for storing the toner cartridge 20 packaged in an outer case 30, a customer 16, and a recovery/recycling factory 18 for recovering and recycling the toner cartridge 20 after use. The toner cartridge 20 flows from the production factory 12 as a start point to the product warehouse 24, then to the customer 16, and then to the recovery/recycling factory 18; all of these can be referred to as distribution points. The product distribution management system 10 has a function of integrally managing the flow of the toner cartridge 20 through each of the distribution points.

The product distribution management system 10 attaches an product wireless tag 22 to the toner cartridge 20, attaches an outer-case wireless tag 32 to an outer case, collects information acquired by wirelessly communicating with these tags to a data center 60 via a network 50, and performs necessary processing to manage the flow of the toner cartridge 20 through each of the distribution points. As the network 50, networks such as a local area network (LAN), a wide area network (WAN), or the Internet can be used. The configuration and operation at each distribution point will be described below.

The production factory 12 is a factory for producing the toner cartridge 20, and it may be a factory exclusively for toner cartridges or a department of a printer manufacturing factory. At the production factory 12, the product wireless tag 22 is fixedly attached to the produced toner cartridge 20. As the product wireless tag 22, a wireless tag capable of short-distance wireless communication in the 13.56 MHz band, for example, can be used. The product wireless tag 22 can be affixed to the toner cartridge 20 with adhesive, for example, or, as a further example, with screws or the like, when the product wireless tag 22 has a form of a circuit board. Alternatively, the product wireless tag 22 may be embedded in the toner cartridge 20 when the toner cartridge 20 is molded. Data regarding the toner cartridge 20 is stored in the product wireless tag 22 attached to the toner cartridge 20 by a reader/writer 24. The reader/writer 24 is a data transceiver having wireless transmitting and receiving functions and is connected to a data control computer 26. As the data control computer 26, a common computer device such as, for example, a personal computer (PC) can be used.

The data written to the product wireless tag 22 is data specific to the toner cartridge 20 to which the product wireless tag 22 is attached, including data specifying the toner cartridge 20, such as toner color and toner quantity capacity; quality data acquired at the production factory 12 and the like; identification data such as a manufacture serial number; and the like. Furthermore, a product wireless tag ID for identifying the product wireless tag 22 from other tags is included. The data is stored in a product production database 28.

The toner cartridge 20 to which the product wireless tag 22 is attached is sent to the product warehouse 14, where it is packaged in the outer case 30. It is preferable that the toner cartridge 20 is packaged in the outercase 30 in a form suitable for conveyance and storage of the toner cartridge 20. The outer-case wireless tag 32 is securely affixed to the outer case 30. As the outer-case wireless tag 32, a 2.45 GHz wireless tag for, for example, which is capable of communication over a longer distance than the product wireless tag 22, can be used. The outer-case wireless tag 32 can be attached with suitable fixing means, such as an adhesive or screws, depending on the material and construction of the outer case 30.

A correlation computer 36 is arranged in the product warehouse 14 as a terminal device of the product distribution management system 10. The correlation computer 36 is connected to a reader/writer 35 for wirelessly communicating with the outer-case wireless tag 32 and a reader/writer 34 for wirelessly communicating with the product wireless tag 22. The reader/writers 34 and 35 may be similar to the reader/writer 24 of the production factory 12.

The correlation computer 36 has a function of assigning to the outer-case wireless tag 32 an outer-case wireless tag ID for identifying the outer-case wireless tag 32 from other tags and a function of correlating the given outer-case wireless tag ID and the product wireless tag ID of the product wireless tag 22 of the toner cartridge 20 packaged in an outer case with each other. Specifically, an outer-case wireless tag ID is written in the outer-case wireless tag 32 with the reader/writer 35. Then, the product wireless tag ID is read by the reader/writer 34, and the outer-case wireless tag ID is read by the reader/writer 35 for confirmation. The read-out product wireless tag ID and outer-case wireless tag ID are stored in a warehouse management server 40, and simultaneously transmitted to the data center 60 via the network 50.

The data center 60 is a computer having a function of integrally managing distribution management data for a product. Especially the data center has the function of correlation among respective data in a contents list. FIG. 2 is an example of a contents list 70, which is a table for associating respective data. At the product warehouse 14, data indicating the correlation of the product wireless tag 22 with the outer-case wireless tag 32 is written in the data area marked with a coarse hatching having lines down to the left in FIG. 2. Specifically, the product wireless tag ID of the product wireless tag 22 is written in a product wireless tag column of the contents list 70, and the outer-case wireless tag ID of the outer-case wireless tag 32 is written in an outer-case wireless tag column of the contents list 70.

The toner cartridge 20 packaged in the outer case 30 is delivered to the customer 16 by a delivery truck 15, for example, in accordance with delivery instructions received from a sales or management department, not shown. A delivery person, such as delivery truck driver, carries a portable reader/writer 42 when making a delivery to the customer 16. The reader/writer 42 has the same function as the reader/writers 24, 34 and 35 described above, as well as an additional functions of connecting to the network 50 via an Internet adapter or the like and of acquisition inputting data by the delivery person.

At the premises of the customer 16, the delivery person correlates the delivery data with the outer-case wireless tag ID through a process described below, and transmits the delivery data to the data center 60 via the network 50. That is, the reader/writer 42 is connected to the network 50 with the use of an Internet adapter or the like. Then, the reader/writer 42 is used to read the outer-case wireless tag ID from outer-case wireless tag. The customer code of the customer 16 is read from a customer ID list 43 prepared in advance. The customer ID list 43 enabling of reading and writing of data using wireless is convenient. Delivery timing such as the date and time of delivery is also input using the acquisition data function of the reader/writer 42. The customer ID of the customer 16 and the delivery time correspond to delivery information of the toner cartridge 20 packaged in the outer case 30. The delivery information is transmitted to the data center 60 via the network 50 together with the outer-case wireless tag ID data.

Data transmitted to the data center 60 are correlated in the contents list 70. Referring again to the contents list 70 in FIG. 2, the data transmitted by the delivery person from the customer 16 is written in the area marked with a fine hatching having lines down to the left. Specifically, data corresponding to the transmitted outer-case wireless tag ID is first retrieved from the outer-case wireless tag column. The table field of the written data on that line is indicated in FIG. 2 by a circle mark. A line on which existing the circle mark, the table field of the retrieved outer-case wireless tag ID, is a data line on which existing each data having the relation with the same outer-case wireless tag ID. Then, the customer code of the customer 16 is written in a table field in a delivery destination column and on that line corresponding to the table field existing the circle mark in the outer-case wireless tag column. And also delivery date and time data is written in a corresponding table field in a delivery time column on that line. In this way, delivery information is added and written in association with the outer-case wireless tag 32 of the outer case 30 delivered to the customer 16.

When the toner cartridge 20 packaged in the outer case 30 is delivered to the customer 16 as described above, the customer removes the toner cartridge 20 from the outer case 30 and installs it in a copier, for example. When the toner in the toner cartridge 20 has been completely consumed or when any problems arise during use of the toner cartridge 20, the cartridge is removed from the copier and returned back to the toner cartridge maker. The returned toner cartridge 20 is sent to the recovery/recycling factory 18.

The returned toner cartridge 20 may be sent back in any outer case, and a wireless tag maybe attached to the outer-case. However, as it is possible that the returned toner cartridge 20 has been packed in an outer case different from the outer case in which the returned toner cartridge 20 was initially packaged, it is preferable that the toner cartridge 20 be removed from its outer case and that desired data be read from the product wireless tag 22 attached to the toner cartridge itself, rather than from the wireless tag attached to the returned outer case.

At the recovery/recycling factory 18, a data control computer 46 is provided for use as a terminal for the product distribution management system 10. The data control computer 46 maybe similar to the data control computer 26 of the production factory 12, for example. The data control computer 46 is connected to a reader/writer 44 to enable wireless communication with the product wireless tag 22. The reader/writer 44 may be similar to the reader/writer 24 of the production factory 12.

The reader/writer 44 reads the product wireless tag ID from the product wireless tag 22. The product wireless tag ID is stored in a product recovery database 48 together with recovery timing data. When the toner cartridge 20 is recovered, recycled, and processed, data correlated with these processes is stored in the product recovery database 48 as recovery information. The downloaded product wireless tag ID and the recovery information such as recovery timing are transmitted to the data center 60 via the network 50.

Correlation in the contents list 70 of the data transmitted to the data center 60 is performed. Once again referring to the contents list 70 in FIG. 2 again, the data transmitted from the recovery/recycling factory 18 is written in the area marked with a hatching having lines down to the right. Specifically, data corresponding to the transmitted product wireless tag ID is first retrieved from the product wireless tag column. The table field of the data is indicated with a triangle mark in FIG. 2. The line on which existing the triangle mark is the same line on which existing the circle mark, because these data already are correlated at the product warehouse 14. Then, recovery date and time data are written in the table field in the recovery time column on that line corresponding to the table field on which existing the triangle mark. In this way, recovery information is added and written in correlation with the product wireless tag 22 of the toner cartridge 20 returned to the recovery/recycling factory 18.

As seen from the contents list 70 in FIG. 2, the product wireless tag ID attached at the production factory 12, the outer-case wireless tag ID attached at the product warehouse 14, the delivery information transmitted together with the outer-case wireless tag ID from the customer 16, and the recovery information transmitted together with the product wireless tag ID from the recovery/recycling factory 18 are managed in integrally correlated with one another. This is possible because the product wireless tag ID and the outer-case wireless tag ID are correlated with each other at the product warehouse 14. The correlation of data makes it possible to perform integrated management using either wireless tag ID for creating distribution management data at the distribution points after the product warehouse 14.

The data center 60 is provided with an ID resolution server 62 and a contents sever 64. The data center 60 is connected to the terminal of each distribution point via the network 50 and is capable of managing detailed data acquired at each distribution point in addition to the data described in the explanation of the contents list 70. Although The manufacturing serial number, specification, quality data, and the like of each toner cartridge 20 can be read from that cartridge's product wireless tag 22, at the product warehouse 14 or at the recovery/recycling factory 18, it is, of course, possible for the data center 60 to manage product information in the production database 28 by connecting to the data control computer 26 of the production factory 12.

At the data center 60, data related to the toner cartridge 20, such as production information and recovery information, is centrally and integrally managed, enabling centralized solutions to toner cartridge problems.

For example, by combining production information, delivery information and recovery information, it is possible to get the period from production to recovery/recycling, confirm whether the toner cartridge, a consumable item, is within a period of life validity and identify toner cartridges which are already beyond their period of life validity but have not been recovered yet. This information can be utilized to provide various enhanced after-sale services to customers, and to facilitate repair and maintenance.

Furthermore, if a problem arises related to a certain model or production of toner cartridge in a market, it is possible to quickly ascertain the total production, shipment, and recoverable quantities of that type of toner cartridge. And it is also possible to quickly retrieve data of the customers who have received toner cartridges that should be recalled, or the like. It is also possible to quickly correlate such data with production data, quality data, and the like related to the production factory.

As described above, the present invention makes it possible to improve customer service, to perform recovery/recycling more efficiently, and to solve problems, such as quality control problems, much more rapidly.

The disclosure of Japanese Patent Application No. 2004-158761 filed on May 28, 2004, including specification, claims, drawings, and abstract, is incorporated herein by reference in its entirety.

What is claimed is:

1. A system that performs distribution management of a product packaged in an outer case for delivery, using wireless tags fixed respectively on the product and the outer case, that enable data reading and written via wireless communication, said system comprising:

correlation unit that correlates an ID of a product wireless tag fixed on the product and an ID of an outer-case wireless tag fixed on the outer case with each other, the correlation unit correlating at least one of a production information, a delivery information of the product, and a recovery information;

multiple acquisition unit that acquires at least one of the product wireless tag ID and the outer-case wireless tag ID at each of multiple distribution points through which the product flows;

distribution management unit that manages distribution of the product using at least one of the both of the correlated wireless tag IDs; and confirmation unit that confirms whether the product is within a period of life validity.

2. The product distribution management system according to claim 1; wherein the correlation unit correlates the product wireless tag ID and the outer-case wireless tag ID with each other at a point of shipment of the product.

3. The product distribution management system according to claim 2, further comprising:

a storage unit that stores both of the correlated wireless tag IDs in the form of a contents list.

4. The product distribution management system according to claim 3, wherein the multiple acquisition unit, at a delivery point where the product is delivered to a customer, reads the outer-case wireless tag ID and acquires delivery information related to delivery to the customer; and the storage unit adds the delivery information to the contents list in correlation with the product wireless tag ID and the outer-case wireless tag ID.

5. The product distribution management system according to claim 4, wherein the delivery information includes information concerning delivery time when the product has been delivered and a customer code that identifies the customer to whom the product has been delivered.

6. The product distribution management system according to claim 5, wherein the multiple acquisition unit, at a recovery point where the product is recovered from the customer, reads the product wireless tag ID and acquires recovery information about the recovered product, including recovery time; and the storage unit add the recovery information to the contents list in correlation with the product wireless tag ID and the outer-case wireless tag ID.

7. The product distribution management system according to claim 6, further comprising:

a recovery condition management apparatus that extracts products which have not been recovered yet from among shipped products based on contents of the contents list stored in the storage unit.

8. A system for performing distribution management of a product packaged in an outer case for delivery and which is returned to a recovery and recycling factory for recycling, using wireless tags, fixed on the product and the outer case, which enable data reading and written via wireless communication, said system comprising:

correlation unit that correlates an ID of a product wireless tag fixed on the product and an ID of an outer-case wireless tag fixed on an outer case with each other, the correlation unit correlating at least one of a production information, a delivery information, a recovery information, and a recycling information of the product;

multiple acquisition unit that acquires at least one of the product wireless tag ID and the outer-case wireless tag ID at each of multiple distribution points through which the product flows;

distribution management unit that manages distribution of the product using at least one of the both of the correlated wireless tag IDs; and confirmation unit that confirms whether the product is within a period of life validity.

9. A system for performing distribution management of a toner cartridge packaged in an outer case for delivery, using wireless tags, fixed on the product and the outer case, which enable data reading and written via wireless communication, said system comprising:

correlation unit that correlates an ID of a toner cartridge wireless tag fixed on the toner cartridge and an ID of an outer-case wireless tag fixed on the outer case with each other, the correlation unit correlating at least one of a production information and a delivery information of the product;

multiple acquisition unit that acquires at least one of the toner cartridge wireless tag ID and the outer-case wireless tag ID at each of multiple distribution points through which the toner cartridge flows;

distribution management unit that manages distribution of the toner cartridge using at least one of the both of the correlated wireless tag IDs; and confirmation unit that confirms whether the toner cartridge is within a period of life validity, based on content of a contents list.

10. The toner cartridge distribution management system according to claim 9, further comprising:

storage unit that stores both of the correlated wireless tag IDs in the contents list.

11. The toner cartridge distribution management system according to claim 10, further comprising:

identifying unit that identifies a toner cartridge which is already beyond its period of life validity, based on the content of the contents list.

12. The toner cartridge distribution management system according to claim 11, further comprising:

retrieval unit to retrieve data of a customer who has received a toner cartridge what should be recalled, based on the content of the contents list.

13. A method for performing distribution management of a product packaged in an outer case for delivery, using wireless tags, fixed on the product and the outer case, which enable data reading and written via wireless communication, said method comprising:

correlating an ID of a product wireless tag fixed on the product and an ID of an outer-case wireless tag fixed on the outer case with each other, the correlation step correlating at least one of a production information and a delivery information of the product;

acquiring at least one of the product wireless tag ID and the outer-case wireless tag ID at each of multiple distribution points through which the product flows;

managing distribution of the product using at least one of the both of the correlated wireless tag IDs; and confirming whether the product is within a period of life validity.

14. The product distribution management method according to claim 13; wherein during the correlating step, the product wireless tag ID and the outer-case wireless tag ID are correlated with each other at a point of shipment of the product.

15. The product distribution management method according to claim 14, further comprising:

storing both of the correlated wireless tag IDs in the form of a contents list.

16. The product distribution management method according to claim 15, wherein at the acquisition step, the outer-case wireless tag ID is read and delivery information related to delivery to the customer is acquired at a delivery point where the product is delivered to a customer; and during the storing step, the delivery information is added to the contents list in correlation with the product wireless tag ID and the outer-case wireless tag ID.

17. The product distribution management method according to claim 16, wherein the delivery information includes information concerning delivery time when the product has been delivered and a customer code that identifies the customer to whom the product has been delivered.

18. The product distribution management method according to claim 17, wherein at the acquisition step, the product wireless tag ID is read and recovery information about the recovered product, including recovery time, is acquired at a recovery point where the product is recovered from the customer; and at the storing step, the recovery information is added to the contents list in correlation with the product wireless tag ID and the outer-case wireless tag ID.

19. The product distribution management method according to claim 18, further comprising:

extracting products which have not been recovered yet from among shipped products based on contents of the contents list stored in the storage means.

* * * * *